June 16, 1936.  P. O. DORER ET AL  2,044,423
STARTING DEVICE FOR SYNCHRONOUS ELECTRIC MOTORS
Filed July 17, 1934
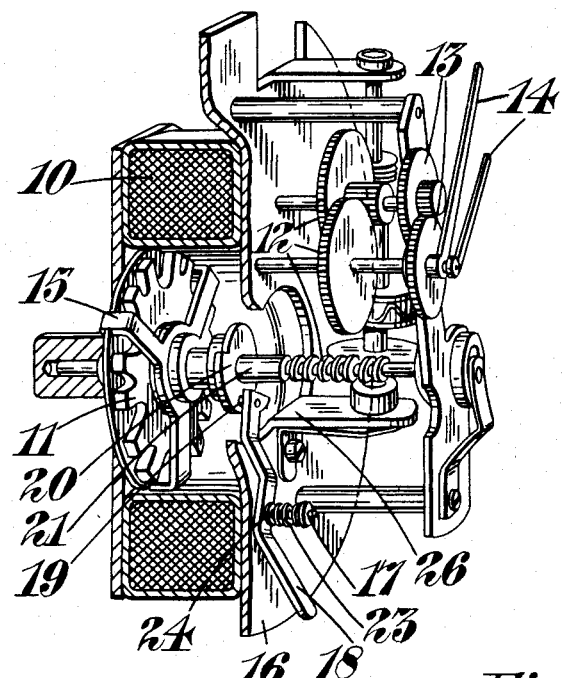
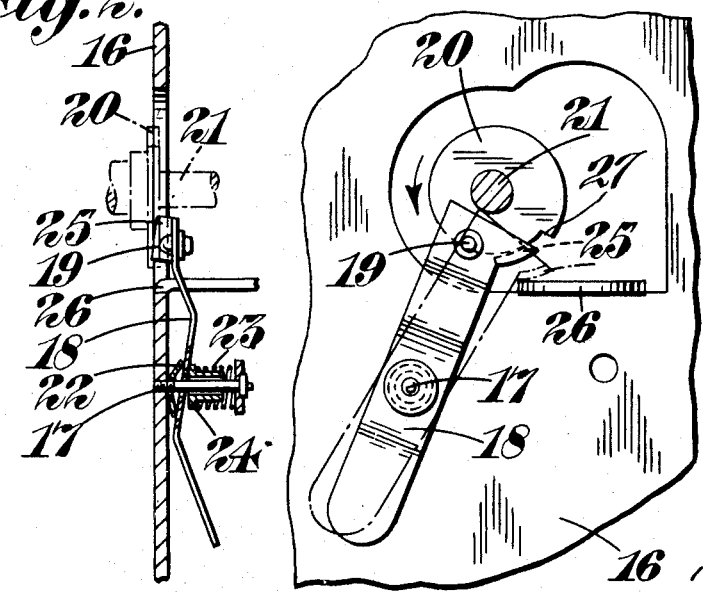
INVENTORS
P. O. Dorer
and H. H. Landstad
By Watson, Cott, Snow + Grindle
ATTYS.

Patented June 16, 1936

2,044,423

UNITED STATES PATENT OFFICE 2,044,423

STARTING DEVICE FOR SYNCHRONOUS ELECTRIC MOTORS

Primus Otto Dorer and Halvor Folkestad Landstad, London, England, assignors to S. Smith & Sons (Motor Accessories), Limited, London, England, a British company Application July 17, 1934, Serial No. 735,696
In Great Britain July 26, 1933

7 Claims. (Cl. 188—81)

This invention relates to starting devices for synchronous electric motors more especially for electric clocks. For the starting of small synchronous motors it is known to employ soft iron elements in the position of inter-poles on the rotor of the motor which produce a movement of the rotor when the motor is switched on sufficiently for starting but having no control over the direction of rotation of the motor. An object of this invention is to provide means to ensure that the motor on being started shall always rotate in a predetermined direction.

According to this invention there is provided a synchronous electric motor comprising the combination with a self-starting means of a controlling stop member movable into and out of engagement with the rotor or a part driven thereby and operated by, and according to the direction of, the rotation of the motor. Thus, should the rotor tend to commence rotation in the wrong direction on starting the stop member is brought into operation to prevent this rotation, but is moved out of engagement immediately the rotor tends to rotate in the required direction.

Preferably, the stop member is provided with a bearing part which is in permanent frictional engagement with a part driven by the rotor for moving the stop member according to the direction of rotation. In one construction according to the invention the stop member comprises a pivoted arm which frictionally engages the face of a disc or flange on the rotor spindle and is movable in a plane parallel to the disc. This arm is conveniently formed with a detent co-operating with a radial projection on the disc to stop the rotor in one direction of rotation. The disc is preferably in the form of a snail cam for the purpose of ensuring that the rotor shall not be stopped by the detent when rotating in the required direction.

One specific embodiment of the invention as applied to a synchronous electric clock is illustrated, by way of example, in the accompanying drawing, in which—

Figure 1 is a general perspective view partly in section of the clock mechanism, Figure 2 is an enlarged detail side view of the controlling stop member, and Figure 3 is a front view of the stop member as shown in Figure 2.

Referring to the drawing the electric clock shown in Figure 1 comprises a synchronous electric motor having a stator 10 and a rotor 11 which latter drives in the known manner through trains of gears 12 and 13 the indicating pointers of the clock.

The rotor 11 comprises, in addition to the armature stamping, a three-pointed soft iron element 15 having the extremities lying between poles of the armature for producing movement of the rotor for self-starting purposes on switching on the electric supply to the stator 10. With this arrangement for self-starting, the rotor may commence rotation in either direction.

On a frame member 16 of the clock mechanism there is provided a pivot pin 17 carrying a pivoted arm 18. At one extremity of this arm there is provided a small friction pad 19 of gut or like material which bears upon the face of a disc 20 rigidly mounted on the spindle 21 of the rotor. The arm 18 lies against a disc-shaped washer 22 on the pivot pin 17 and is resiliently held in contact therewith by means of a compression spring 23 engaging a sleeve 24 bearing on the outer side of the arm 18. The arm is bent so that by means of the spring 23 the friction pad 19 is caused to bear lightly upon the disc 20.

The arm 18 is formed with a detent 25 and is permitted to have small angular movement about its pivot limited in one direction by the engagement of the detent with the periphery of the disc 20 and in the other direction by a stop constituted by a fixed part 26 of the frame. The detent co-operates with a radial projection 27 on the disc 20 which latter is shaped as a snail cam. In operation the arm 18 by its frictional engagement with the disc 20 tends to move to one or the other limit of its travel according to the direction of rotation of the rotor. When rotation commences in the required direction as shown by the arrow in Figure 3, the arm 18 is moved to the position (shown in chain lines in Figure 3) in which the detent 25 is remote from the disc 20 and the rotation is permitted to continue.

Should rotation commence in the opposite direction the arm 18 is moved by reason of the frictional engagement with the disc 20 to the position as shown in full lines in Figure 3 in which the detent 25 is in the path of the projection 27 of the disc to stop the rotor. The starting of the motor is ensured by the starting means aforesaid so that the rotation will at once commence in the required direction. The disc on the rotor spindle is conveniently in the form of a snail cam of small pitch since by this construction the rotor cannot be prevented from rotating in the required direction by the detent.

We claim:

1. In a self-starting synchronous electric motor, a disc on the rotor spindle, said disc having a radial abutment, a pivoted arm frictionally bearing on said disc and capable of movement in a plane parallel with the disc and in one direction or the other according to the direction of rotation of the rotor and a detent on said arm to engage the said abutment by movement of the arm according to one direction of rotation of the rotor.

2. In a self-starting synchronous electric motor, a disc on the rotor spindle, said disc being in the form of a snail cam and having a radial abutment, a pivoted arm frictionally bearing on said disc and capable of movement in a plane parallel with the disc and in one direction or the other according to the direction of rotation of the rotor and a detent on said arm to engage the said abutment by movement of the arm according to one direction of rotation of the rotor.

3. In a self-starting synchronous electric motor, a controlling stop-member movable into and out of engagement with a rotating part of the said motor, a bearing member in permanent frictional engagement with said rotating part and connected to said stop-member whereby said stop-member is moved into and out of engagement according to the direction of rotation of the motor and a fixed stop limiting the movement of said stop-member.

4. In a self-starting synchronous electric motor, a disc rotated by the motor, which disc is formed with a radial abutment, a pivoted stop-member comprising a detent co-operating with said abutment and a friction pad bearing on the face of said disc and moving the stop-member to engage and disengage the detent with the said abutment according to the direction of rotation of the motor and a fixed stop limiting the movement of said stop-member.

5. In a self-starting synchronous electric motor, a rotating part having both a frictional face and an abutment, a movable detent member having both a frictional face adapted to engage the first said frictional face and to be moved by it and a stop adapted to engage positively said abutment, a mounting for said detent member on a fixed part of said motor, which mounting is adapted to maintain said frictional faces in permanent engagement and to constrain said detent member to be moved by the rotating part in such a direction that at one limit of its movement the stop is out of the path of travel of the abutment and at the other limit it is in said path.

6. In a self-starting synchronous electric motor, a rotating part having both a frictional face and an abutment, a pivoted detent arm having both a frictional face adapted to engage the said frictional face on the rotating part and a stop adapted to engage positively the said abutment, a fixed pivot on which the detent is pivoted with the frictional faces in engagement so that the arm is biased to turn about its pivot in a direction dependent on the direction of rotation of the rotating part to move the said abutment into or out of the path of the abutment and a fixed stop co-operating with the detent arm to limit the movement of the stop away from the path of the abutment.

7. In a self-starting synchronous electric motor, a rotating part having both a frictional face and an abutment, a movable detent member having both a frictional face adapted to engage the first said frictional face and to move with it and a stop adapted to engage positively said abutment, a mounting for said movable detent member on a fixed part of the motor which mounting is adapted to maintain said frictional faces in permanent engagement and to constrain said movable detent member to move in such a direction that at one limit of its movement the stop is out of the path of the abutment and at the other limit it is in said path to interrupt rotation of the rotating part.

PRIMUS OTTO DORER.
HALVOR FOLKESTAD LANDSTAD.